(12) United States Patent
Kim et al.

(10) Patent No.: US 10,761,612 B2
(45) Date of Patent: *Sep. 1, 2020

(54) GESTURE RECOGNITION TECHNIQUES

(71) Applicant: Microsoft Technology Licensing, LLC, Redmond, WA (US)

(72) Inventors: David Kim, Cambridge (GB); Otmar D. Hilliges, Cambridge (GB); Shahram Izadi, Cambridge (GB); Patrick L. Olivier, York (GB); Jamie Daniel Joseph Shotton, Cambridge (GB); Pushmeet Kohli, Cambridge (GB); David G. Molyneaux, Cambridge (GB); Stephen E. Hodges, Cambridge (GB); Andrew W. Fitzgibbon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,515

(22) Filed: May 15, 2019

(65) Prior Publication Data

US 2019/0278380 A1    Sep. 12, 2019

Related U.S. Application Data

(63) Continuation of application No. 15/162,905, filed on May 24, 2016, now Pat. No. 10,331,222, which is a continuation of application No. 14/280,140, filed on May 16, 2014, now Pat. No. 9,372,544, which is a continuation of application No. 13/118,884, filed on May 31, 2011, now Pat. No. 8,760,395.

(51) Int. Cl.
*G06F 3/01* (2006.01)
*G06F 3/0481* (2013.01)
*G06F 3/03* (2006.01)
*G06T 7/73* (2017.01)
*G06K 7/00* (2006.01)
*G06K 9/00* (2006.01)

(52) U.S. Cl.
CPC .............. *G06F 3/017* (2013.01); *G06F 3/011* (2013.01); *G06F 3/0304* (2013.01); *G06F 3/04815* (2013.01); *G06K 9/00355* (2013.01); *G06T 7/75* (2017.01); *G06T 2207/10028* (2013.01); *G06T 2207/30196* (2013.01)

(58) Field of Classification Search
None
See application file for complete search history.

(56) References Cited

U.S. PATENT DOCUMENTS 8,760,395 B2 * 6/2014 Kim ......................... G06T 7/75
                                                345/156
9,372,544 B2 * 6/2016 Kim ....................... G06F 3/011

* cited by examiner

*Primary Examiner* — Benjamin C Lee
*Assistant Examiner* — Emily J Frank
(74) *Attorney, Agent, or Firm* — Alleman Hall Creasman & Tuttle LLP (57) ABSTRACT

In one or more implementations, a static geometry model is generated, from one or more images of a physical environment captured using a camera, using one or more static objects to model corresponding one or more objects in the physical environment. Interaction of a dynamic object with at least one of the static objects is identified by analyzing at least one image and a gesture is recognized from the identified interaction of the dynamic object with the at least one of the static objects to initiate an operation of the computing device.

20 Claims, 7 Drawing Sheets

GESTURE RECOGNITION TECHNIQUES

RELATED APPLICATIONS

This application is a continuation of U.S. patent application Ser. No. 15/162,905 filed May 24, 2016, which is a continuation of U.S. patent application Ser. No. 14/280,140 filed May 16, 2014, now granted as U.S. Pat. No. 9,372,544, which is a continuation of U.S. patent application Ser. No. 13/118,884, filed May 31, 2011, now granted as U.S. Pat. No. 8,760,395, the entire disclosure of each of which are hereby incorporated by reference.

BACKGROUND

Display and input techniques utilized by computing devices are ever evolving. For example, initial computing devices were provided with monochrome monitors. A user interacted with the computing device by viewing simple text on the monochrome monitor and entering text via a keyboard that could then be viewed on the monitor.

Display and input techniques were then expanded into use of color and graphical user interfaces. These techniques, for instance, may be utilized to show graphics to represent files, devices connected to the computing device, images, and so on using color. A user may then interact with the graphical user interface using the keyboard as well as by using a cursor control device, such as a mouse.

Display and input techniques have continued to evolve, such as to sense touch using a touchscreen display of a computing device to recognize gestures. However, these techniques often involved sensing of actual contact by a sensor that was integral to the touchscreen device and therefore limited these techniques to detection of physical interaction between the user and the computing device.

SUMMARY

Gesture recognition techniques are described. In one or more implementations, a static geometry model is generated, from one or more images of a physical environment captured using a camera, using one or more static objects to model corresponding one or more objects in the physical environment. Interaction of a dynamic object with at least one of the static objects is identified by analyzing at least one image and a gesture is recognized from the identified interaction of the dynamic object with the at least one of the static objects to initiate an operation of the computing device.

In one or more implementations, an orientation or position of a camera of a computing device in a physical environment is detected. One or more inputs are identified from one or more images captured using the camera. A gesture is recognized from a combination of the detected orientation or position of the camera and the one or more inputs that is effective to initiate an operation of one or more computing devices.

In one or more implementations, an apparatus includes a camera configured to capture depth data of a physical environment of the camera and that is included within a housing that is configured to be held by a user. The apparatus also includes one or more modules communicatively coupled to the camera and implemented at least partially in hardware. The one or more modules are configured to generate a static geometry model, from the depth data of the physical environment captured using the camera, using one or more static objects to model corresponding one or more objects in the physical environment, detect an orientation or position of the camera in the physical environment, identify interaction of a dynamic object with at least one of the static objects by analyzing at least one image, and recognize a gesture from the detected orientation or position of the camera and the identified interaction of the dynamic object with the at least one of the static objects to initiate an operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Touch-based interactions are becoming increasingly commonplace, but conventionally involve specialized sensors built into a touch-sensitive surface. However, by using the techniques as described herein, a model may be generated of a physical environment (e.g., static objects) by capturing images using a camera, such as a depth-sensing camera. The techniques may also be used to detect dynamic objects, such as hands and fingers that are moved in the physical environment. Thus, the techniques may be used to detect interaction of the dynamic objects (e.g., the hands and fingers) with static objects (e.g., a table, chair, or stationary hand) to expand touch gestures to surfaces that do not include the specialized sensors. In this way, touch-sensitive techniques can leverage arbitrary surfaces in the physical environment, e.g., including parts of a user.

Further, the techniques described herein may support gestures that may be defined based on a position or orientation of a camera as well as images detected by the camera. For example, the techniques may be able to detect a position or orientation of a camera (e.g., worn as part of a pair of glasses, part of a mobile phone or tablet, and so on) within the physical surroundings of the camera. The camera may also be used to identify a position or orientation of one or more body parts of a user from images taken by the camera, e.g., movement of a hand to make a grasping motion. The combination of the position or orientation of the camera and the use of images captured by the camera may be used to define gestures to initiate an operation of a computing device. Further discussion of which techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
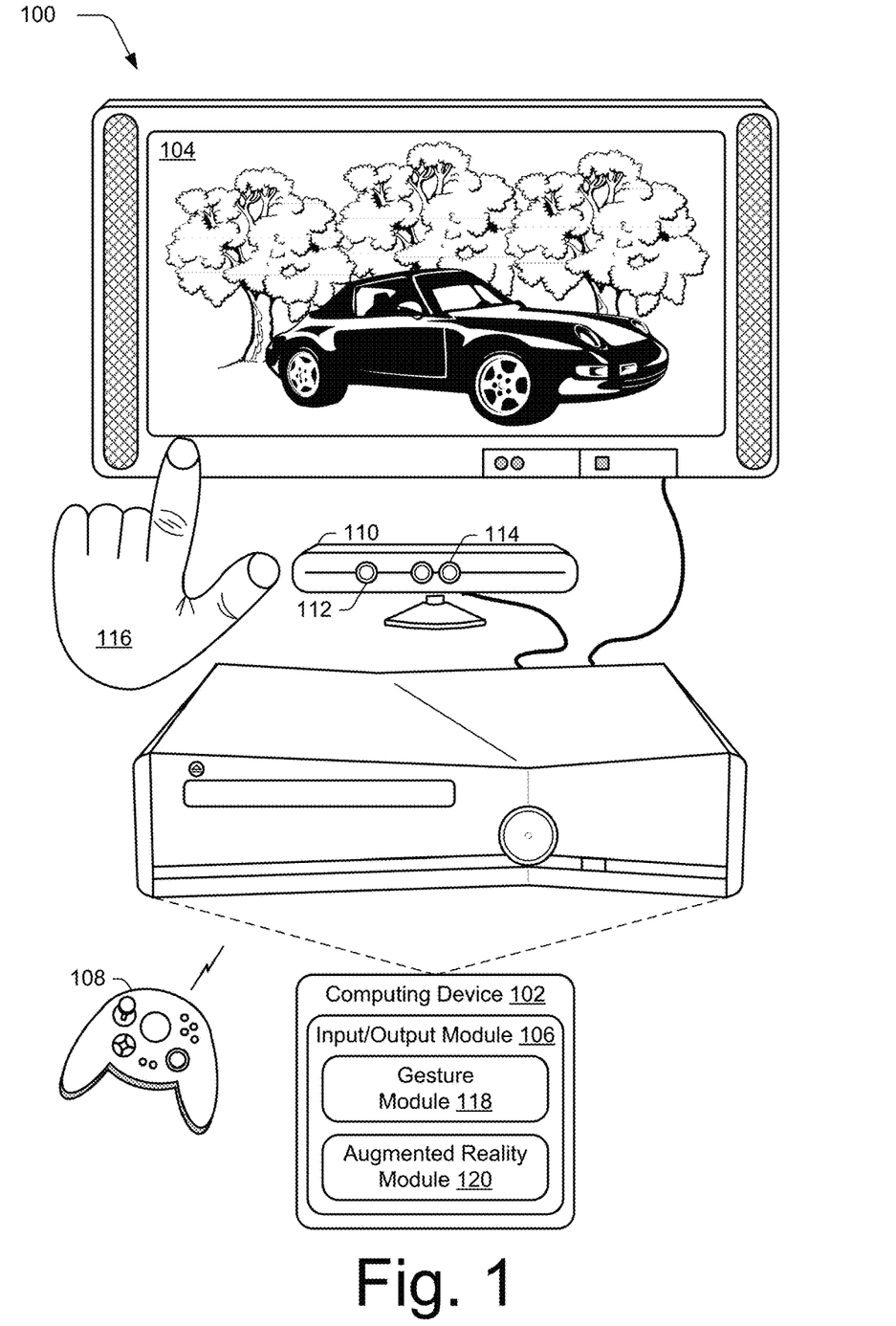
FIG. 1 is an illustration of an environment in an example implementation that is operable to employ gesture techniques described herein.

FIG. 1 is an illustration of an environment 100 in an example implementation that is operable to employ gesture techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a game console communicatively coupled to a display device 104 (e.g., a television) as illustrated, a wireless phone, a tablet, a netbook, and so forth as further described in relation to FIG. 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 106. The input/output module 106 is representative of functionality relating to recognition of inputs and/or provision of outputs by the computing device 102. For example, the input/output module 106 may be configured to receive inputs from a keyboard, mouse, and cause operations to be performed that correspond to the inputs. The inputs may be detected by the input/output module 106 in a variety of different ways.

The input/output module 106 may be configured to receive one or more inputs via touch interaction with a hardware device, such as a controller 108 as illustrated. Touch interaction may involve pressing a button, moving a joystick, movement across a track pad, use of a touch screen of the display device 104 (e.g., detection of a finger of a user's hand or a stylus), and so on. Recognition of the touch inputs may be leveraged by the input/output module 106 to interact with a user interface output by the computing device 102, such as to interact with a game, an application, browse the internet, change one or more settings of the computing device 102, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of the computing device 102 via a touchscreen), and other devices that involve touch on the part of a user or object.

The input/output module 106 may also be configured to provide a natural user interface (NUI) that may recognize gestures that do not involve touch. For example, the computing device 102 may include a NUI input device 110. The NUI input device 110 may be configured in a variety of ways to detect inputs without having a user touch a particular device, such as to recognize audio inputs through use of a microphone. For instance, the input/output module 106 may be configured to perform voice recognition to recognize particular utterances (e.g., a spoken command) as well as to recognize a particular user that provided the utterances.

In another example, the NUI input device 110 that may be configured to recognize gestures through examination of images captured by one or more cameras 112, 114 of the computing device 102. The cameras 112, 114, for instance, may be configured to include multiple lenses and sensors so that different perspectives may be captured and thus determine depth, such as through analysis of a grid projected in a physical environment of the computing device 102. The different perspectives may then be used to determine a relative distance from the NUI input device 110 and thus a change in the relative distance. The different perspectives may be leveraged by the computing device 102 as depth perception. The images may also be leveraged by the input/output module 106 to provide a variety of other functionality, such as techniques to identify particular users (e.g., through facial recognition), objects, and so on.

The input-output module 106 may leverage the NUI input device 110 to perform skeletal mapping along with feature extraction of particular points of a human body (e.g., 48 skeletal points) to track one or more users (e.g., four users simultaneously) to perform motion analysis. For instance, the NUI input device 110 may capture images that are analyzed by the input/output module 106 to recognize one or more motions made by a user, including what body part is used to make the motion as well as which user made the motion. An example is illustrated through recognition of positioning and movement of one or more fingers of a user's hand 116 and/or movement of the user's hand 116 as a whole.

Thus, the motions may be identified as gestures by the input/output module 106 using a gesture module 118 to initiate a corresponding operation. A variety of different types of gestures may be recognized, such a gestures that are recognized from a single type of input (e.g., a motion gesture) as well as gestures involving multiple types of inputs, e.g., a gesture recognized from an image captured by the cameras 112, 114 as well as defined based on a position or orientation of the cameras 112, 114 in a physical environment, which is further described in relation to FIG. 2. Additionally, the gestures may be used for a variety of purposes, such as to cause an augmentation to be generated by an augmented reality module 120 for use as part of an augmented reality display, further discussion of which may be found in relation to FIG. 3.

Accordingly, the gesture module 116 may support a variety of different gesture techniques by recognizing and leveraging a division between inputs. It should be noted that by differentiating between inputs in the natural user interface (NUI), the number of gestures that are made possible by each of these inputs alone is also increased. For example, although the movements may be the same, different gestures (or different parameters to analogous commands) may be indicated using different types of inputs. Thus, the input/output module 106 may provide a natural user interface that supports a variety of user interaction's that do not involve touch.

Accordingly, although the following discussion may describe specific examples of inputs, in instances different types of inputs may also be used without departing from the spirit and scope thereof. Further, although in instances in the following discussion the gestures are illustrated as being input using a NUI, the gestures may be input using a variety of different techniques by a variety of different devices.

Figure 2:
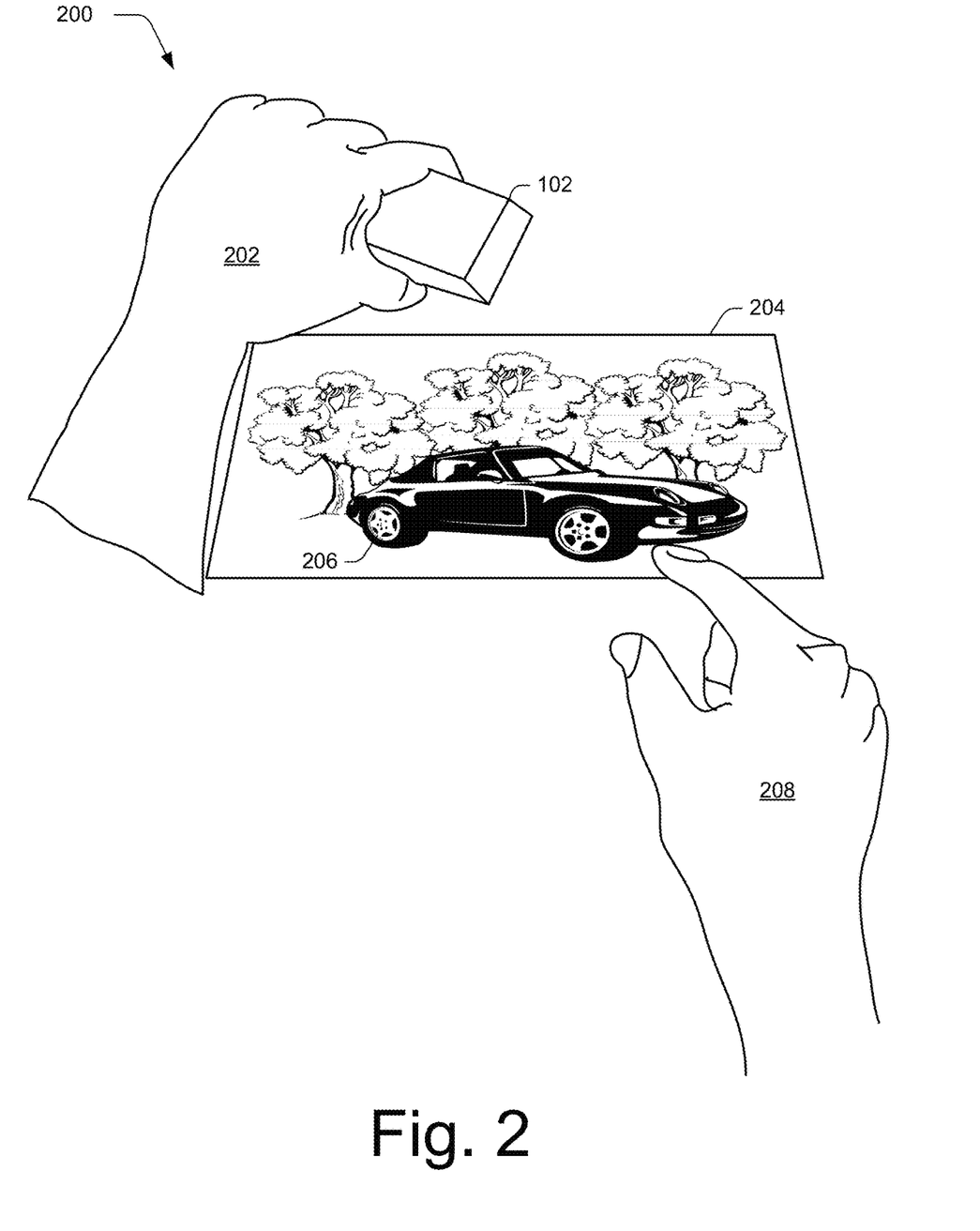
FIG. 2 depicts a system in an example implementation in which a system is illustrated that supports gestures defined based on position or orientation of a camera of the computing device as well as from inputs identified from images captured using the camera.

FIG. 2 depicts a system 200 in an example implementation in which a system is illustrated that supports gestures defined based on position or orientation of a camera of the computing device as well as from inputs identified from images captured using the camera. In this example, the computing device 102 is configured to be held in a user's hand 202, such as a mobile phone, game device, and so on. The computing device 102 as previously described includes a camera (not shown) that captures at least part of a physical environment.

For example, the computing device 102 may capture images to generate a dense three-dimensional model using the camera that contains static objects of the physical environment. In the illustrated implementation, a surface 204 is modeled as a static geometric object and an image 206 of a car and trees is projected by the computing device 102. The image 206 may be projected by the computing device 102 using an aspect ratio and size based on a determination of position and orientation of the computing device 102 in the physical environment. Thus, the computing device 102 may leverage the determination of position and orientation in the physical environment to alter how the device interacts with the physical environment.

For example, a main interaction surface may be extracted and analyzed to model a physical environment as follows. A portion of a surface may be sampled by projecting orthographic rays onto an empty spot of the surface in a dense 3D model. The sampled normal and position values may then be averaged and used to generate a new view matrix for a virtual camera. The surface plane may then be captured by performing an orthographic projection using the previously calculated view matrix and narrow near and far clipping planes. From this, the main surface may be detected and noise removed using a connected components algorithm. Edges and geometrical shapes (e.g., rectangle, triangle, circle, and so on) may then be modeled using computer vision algorithms to generate static objects that represent the environment.

The computing device 102 may also leverage images and other sensors of the computing device 102 to detect interaction with the user interface. For example, the computing device 102 may capture an image of another hand 208 of a user as interacting with the image 206 displayed on the surface 204. A gesture may be recognized from this movement that is configured to initiate an operation of the computing device 102. In the illustrated example, for instance, the gesture may involve "painting" colors onto the car, repositioning the car in the image 206, selecting another car, and so on.

Further, a gesture may be recognized from a combination of the position or orientation of the computing device 102 and inputs detected from the image, e.g., the other user's hand 208. Continuing with the previous example, a scale and skew of the "painting" gesture may be adjusted to follow the image 206. Thus, a definition of a gesture in this example may leverage what is detected through examining an image taken by the camera as well as an orientation or position of the camera in a physical environment. Thus, position and orientation of the camera of the computing device (as well as other parts of the computing device) may be determined in a variety of ways, examples of which are further described in relation to FIG. 3.

In this way, an arbitrary scene may be captured in a dense 3D model using a camera. Once the environment has been sufficiently captured, real-time depth data captured with the camera (e.g., moving) can be used to detect dynamic objects that are touching a part of the dense model of the scene, e.g., the static objects modeled in the scene. Additionally, arbitrary touch interaction may be extended in such way that the size and the proximity of a touching object can be used to enable multi-scale interaction. For example, a user could paint on a surface with their whole arm or by just using a hand (e.g. by resting a forearm on the table) and implicitly control the fidelity of the paint (e.g. by changing the shape and width of the brush strokes). A skeletal hand tracker may be used to detect the body parts that are actively used in the interaction as described in relation to FIG. 1.

Once the depth camera has acquired a reference point in the scene (e.g., a fixed position in space, tracked hand or object, etc.) parameters describing the camera's spatial relationship to the reference point may be used in subsequent interactions. For example, a hand could be used to control high-level movement of a virtual character when the camera captures the scene where the hand could be used to control finer movements of the character's limbs or face depending on how close the camera is being held and where it is pointing.

Further, by tracking the fingers of both hands as previously described, a first hand may act as a base for virtual control elements. An advantage of this approach is that it is fairly straightforward to map different virtual controls to different parts of the hand. This allows a user to feel the touch and clear boundaries between different virtual objects by gliding with a finger on the hand. This is also beneficial when the user wants to focus their attention to a different part of a scene as the user can interact with both of their hands without looking at them.

Other hand pressure can be also simulated by touch. For example, an increase of pressure may be simulated by taking the relative offset of the touch contact point along the touch axis to the initial contact point in space. This can be useful to enable finer control of the position in mid-air, as resistance with the other hand resting on a surface can increase the range of applied force. This may be implemented for a variety of different functionality, such as buttons coupled with linear parameters (e.g., light with dimming, virtual brush with variable width) or individual 3D points in a cluttered point cloud that the user wants to move. A variety of other examples are also contemplated.

The images captured by the computing device 102 may also be used to support a variety of other techniques to support interaction of the computing device 102 with the physical environment. For example, images captured by the camera 112 may be used to identify devices in the physical environment that surrounds the computing device 102. The computing device 102 may then configure a user interface to interact with the identified device, such as a display device illustrated as a television in FIG. 1, a mobile communication device such as a user's mobile phone, a game console, and so forth.

Although a number of examples of user interfaces and gesture interactions have been described, it should be readily apparent that a wide variety of other gestures and user interfaces may leverage the techniques described herein, another example of which is an augmented reality display as further described in relation to the following figure.

Figure 3:
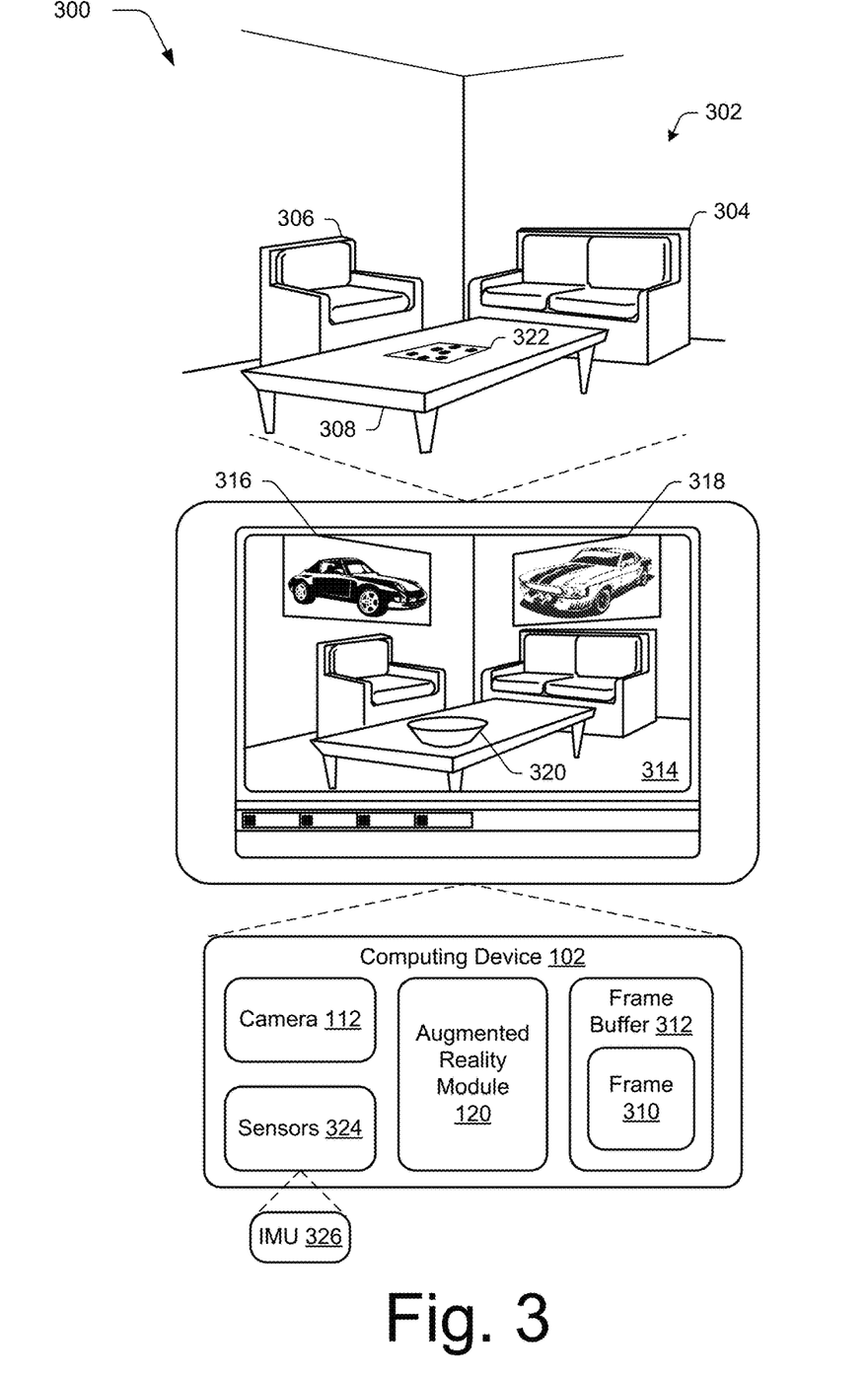
FIG. 3 is an illustration of a system in an example implementation showing used of gestures in an augmented reality system.

FIG. 3 is an illustration of an environment 300 in an example implementation that is operable to employ augmented reality techniques. The illustrated environment 100 includes the computing device 102 configured as a tablet computer. The computing device 102 is also illustrated as including the augmented reality module 120 of FIG. 1. The augmented reality module 120 is representative of functionality of the computing device 102 to augment a view of real-world physical surroundings of the computing device 102. In the illustrated example, for instance, the computing device 102 is illustrated as being physically present in a room 302 that has a couch 304, a chair 306, and a table 308 that are positioned in a corner of the room 302.

As previously described, the computing device 102 includes a camera 112 that is configured to capture one or more images of the physical surroundings of the computing device 102, e.g., the room 302 in this example. These one or more images may be used to capture a view of the "reality" that is to be augmented, although other input devices are also contemplated such as microphones. The augmented reality module 120 may receive data from the camera 112 (e.g., the one or more images) to generate a frame 310, which is illustrated as being stored in a frame buffer 312 of the computing device 102.

The frame 310 may then be displayed by a display device 314 of the computing device 102, which although illustrated as part of a mobile communication device configuration that is illustrated may assume a variety of configurations. In one or more implementations, the display device 314 may be included as part of a helmet or glasses and positioned for viewing by one or more of a user's eyes. Additionally, the display device 314 may or may not be partially transparent. For example, the display device 314 may be configured to display both the image captured by the camera 112 along with augmentations. In another example, the display device 314 may be configured to display the augmentations without the view of the image captured by the camera 112, but permit a view of the physical surroundings to be seen through at least a portion of the display device 314. Thus, the augmentation generated by the augmented reality module 120 may be displayed in a variety of ways.

In the illustrated example, the frame 310 displayed by the display device 314 includes an image captured by the camera 112. The frame 310 also includes a plurality of augmentations that were generated by the augmented reality module 120. Illustrated examples displayed by the display device 314 include first and second pictures 316, 318 that appear positioned on walls of the room 302 as well as a bowl 320 that appears to be placed on the table 308. Thus, the augmented reality module 120 may augment the view of reality displayed by the display device 314 to provide a user interface via which a user may interact with using the gestures previously described. It should be readily apparent that augmentations generated by the augmented reality module 120 may assume a variety of other forms, such as objects as part of a game, projection of the image 206 in FIG. 2, and other changes to a view of the surroundings of a computing device 102.

To generate this view and know "where" to place to augmentations, the augmented reality module 120 may leverage a variety of techniques to determine an orientation and/or position of the computing device 102 in relation to the environment, e.g., the room 302 as illustrated. For example, the augmented reality module 120 may leverage one or more markers to determine how the computing device 102 is positioned, oriented, moved, and so on. In this way, the computing device 102 may determine an orientation or position from images taken by the camera 112.

These markers may take a variety of forms. For instance, the augmented reality module 120 may set one or more view points in the living room as markers and thus serve as a basis to determine orientation and/or positioning using feature extraction as described in relation to FIG. 2, such as a corner of the table 308, orientation of the chair 306, and so on. Thus, the items in the room may act as a basis to determine where the computing device 102 is located within the room.

In another instance, the augmented reality module 120 may leverage a view of one or more augmented reality (AR) tags that are physically positioned within the surrounding environment of the computing device 102. An example AR tag 322 is illustrated as positioned on the table 308 in the living room 302. Although a single AR tag 322 is shown, a plurality of AR tags may be utilized in the environment. The example AR tag 322 (or other markers) may be used as a basis to determine depth (e.g., distance between the AR tag 322 and the camera 112), three-dimensional orientation of the computing device 102 with respect to the AR tag 322, and so forth.

For example, the AR tag 322 may include a pattern that may be recognized by the augmented reality module 120 to determine a distance from the AR tag 322 and/or an orientation of the computing device 102 in relation to the AR tag 322. In this way, markers may be leveraged by the augmented reality module 120 to determine "where" and "how" the computing device 102 is positioned in a physical environment. The augmented reality module 120 may use this determination as a basis to generate augmentations to be output for viewing by a user of the computing device 102.

The augmented reality module 120 may also leverage one or more sensors 324 to determine and verify a position and/or orientation of the computing device 102. For example, the sensors 324 may be configured as an inertial measurement unit (IMU), which may include a gyroscope, one or more accelerometers, a magnetometer, and so on including any combination thereof. Thus, the computing device 102 may employ a variety of different techniques to determine a position or orientation in a physical environment.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

For example, the computing device 102 may include an entity (e.g., software) that causes hardware of the computing device 102 to perform operations, e.g., processors, functional blocks, and so on. The computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Example Procedures

Figure 4:
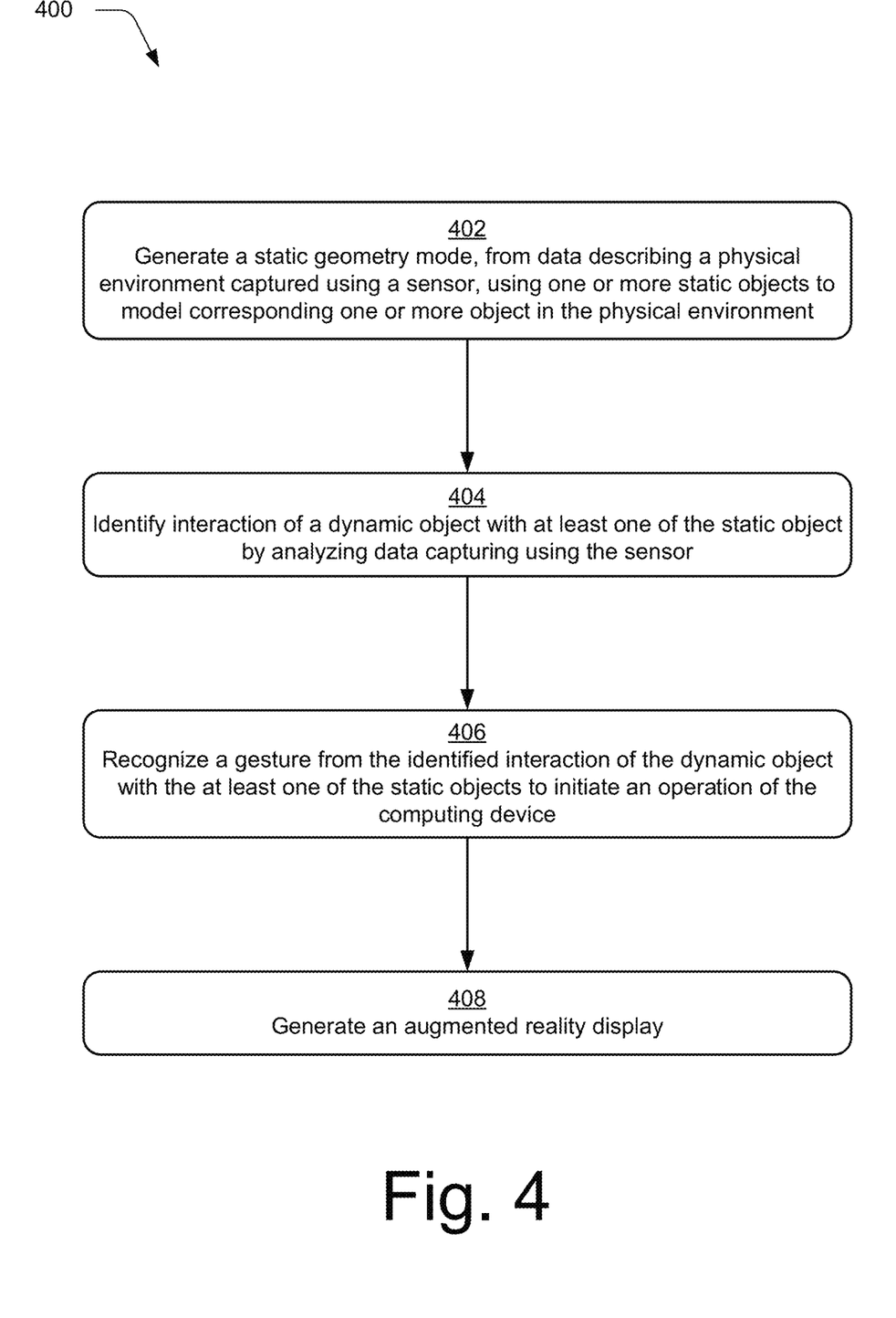
FIG. 4 is a flow diagram depicting a procedure in an example implementation in which a static geometry model is generated and used as a basis to recognize gestures.

The following discussion describes gesture techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment FIG. 4 is a flow diagram depicting a procedure in an example implementation in which a static geometry model is generated and used as a basis to recognize gestures. A static geometry model is generated, from data describing a physical environment captured using a sensor, using one or more static objects to model corresponding one or more objects in the physical environment (block 402). For example, the computing device 102 may examine images captured by the camera 112 to extract features and describe those features using static object to model a physical environment. A variety of other sensors and data are also contemplated, such as laser range finder which may be used to generate data that can be used to infer geometry of a scene.

Interaction of a dynamic object with at least one of the static objects is identified by analyzing at the data (block 404). Continuing with the previous example, the images or other data may be used to determine that a relatively stationary object (e.g., a user's hand) has been touched by a dynamic object, e.g., another hand of the user. Thus, the static objects may be defined using a threshold whereas a dynamic object may be defined as object that exhibits movement above that threshold. Other techniques are also contemplated, such as to use a body part classification system to classify which movement is to be used to define a gesture.

A gesture is recognized from the identified interaction of the dynamic object with the at least one of the static objects to initiate an operation of the computing device (block 406). The gesture, for instance, may be detected from images that describe that a dynamic object has touched the static object above, defined as movement in relation to the static object, and so forth. Thus, the model of the physical environment may serve as a basis for recognizing gestures detected using images captured by the camera.

An augmentation is generated by the computing device for display as part of an augmented-reality display based least in part on the combined basis (block 408). A variety of different augmentations may be generated, such as objects to be viewed via a display device, directional audio, tactile feedback, and so forth. For example, augmentations may be displayed along with a view of a physical environment, an example of which is shown in FIG. 3 in which the display device 314 includes first and second pictures 316, 318 that appear positioned on walls of the living room 302 as well as a bowl 320 that appears to be placed on the table 308 that otherwise is not included in the physical room 302 itself. In this way, the display may augment reality with additional information. Additionally, the display may be performed using a variety of different display devices, such as display devices integrated in a tablet or mobile phone, part of a user-wearable item (e.g., a helmet), a standalone display device as typically found on a desktop, part of a laptop or netbook, and so forth.

Figure 5:
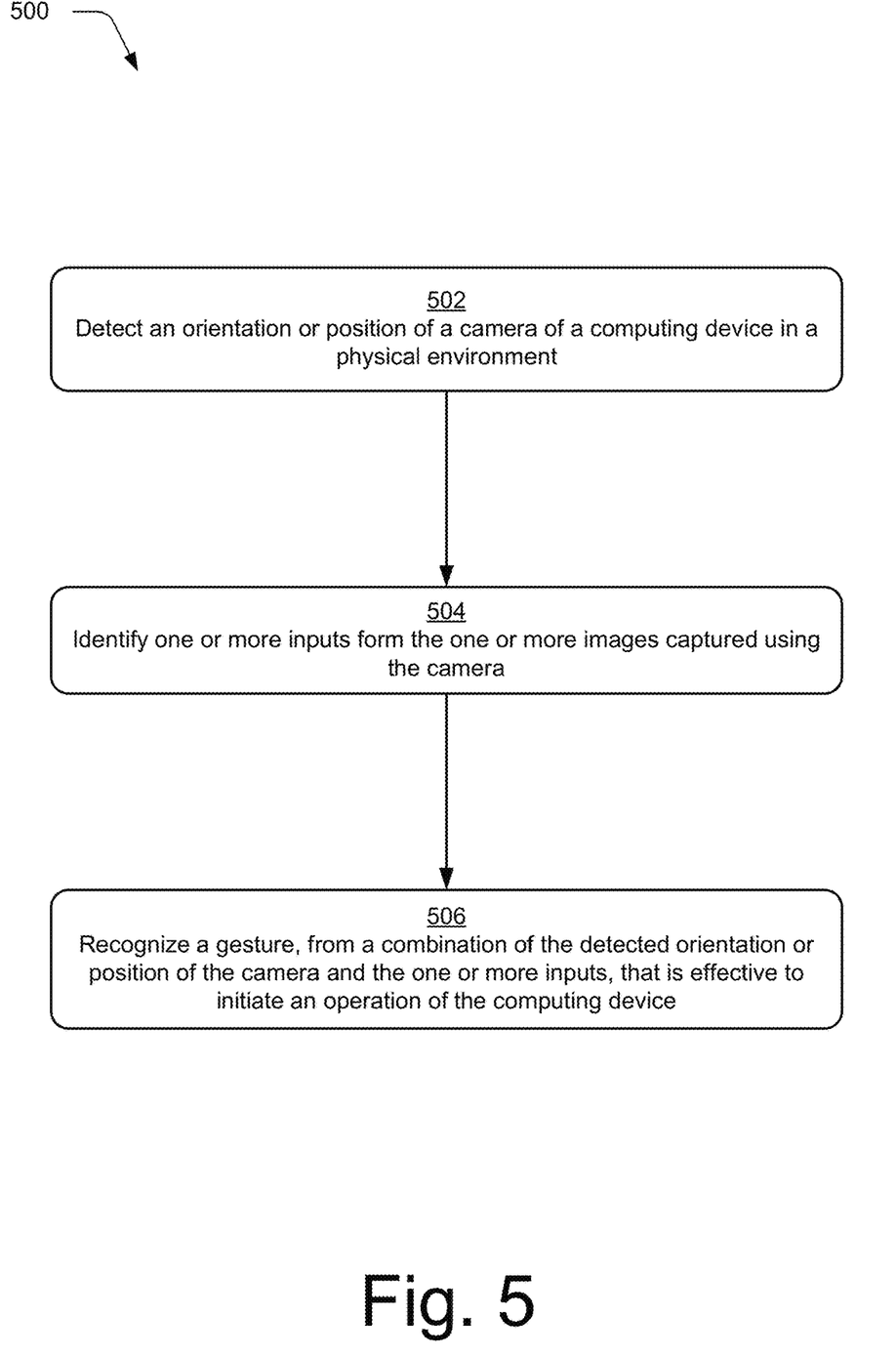
FIG. 5 is a flow diagram depicting a procedure in an example implementation in which a combination of an orientation or position of a camera of computing device and one or more inputs identified from images taken by the camera are used to recognize a gesture.

FIG. 5 depicts a procedure 500 in an example implementation in which a combination of an orientation or position of a camera of computing device and one or more inputs identified from images taken by the camera are used to recognize a gesture. An orientation or position of a camera of the computing device in a physical environment is detected (block 502). This orientation or position may be determined in a variety of ways, such as from images captured using the camera 112, sensors 324 of the computing device 102, and so on.

One or more inputs are identified from one or more images captured using the camera (block 504). A gesture is recognized from a combination of the detected orientation or position of the camera and the one or more inputs that is effective to initiate an operation of one or more computing devices (block 506). The gesture module 120, for instance, may detect movement of objects (e.g., body parts of a user), position, orientation, and so on from images captured by the camera. Further, this identification may also leverage other inputs to define the gesture, such as position or orientation of the camera 112 as described in relation to FIG. 2.

Example System and Device

Figure 6:
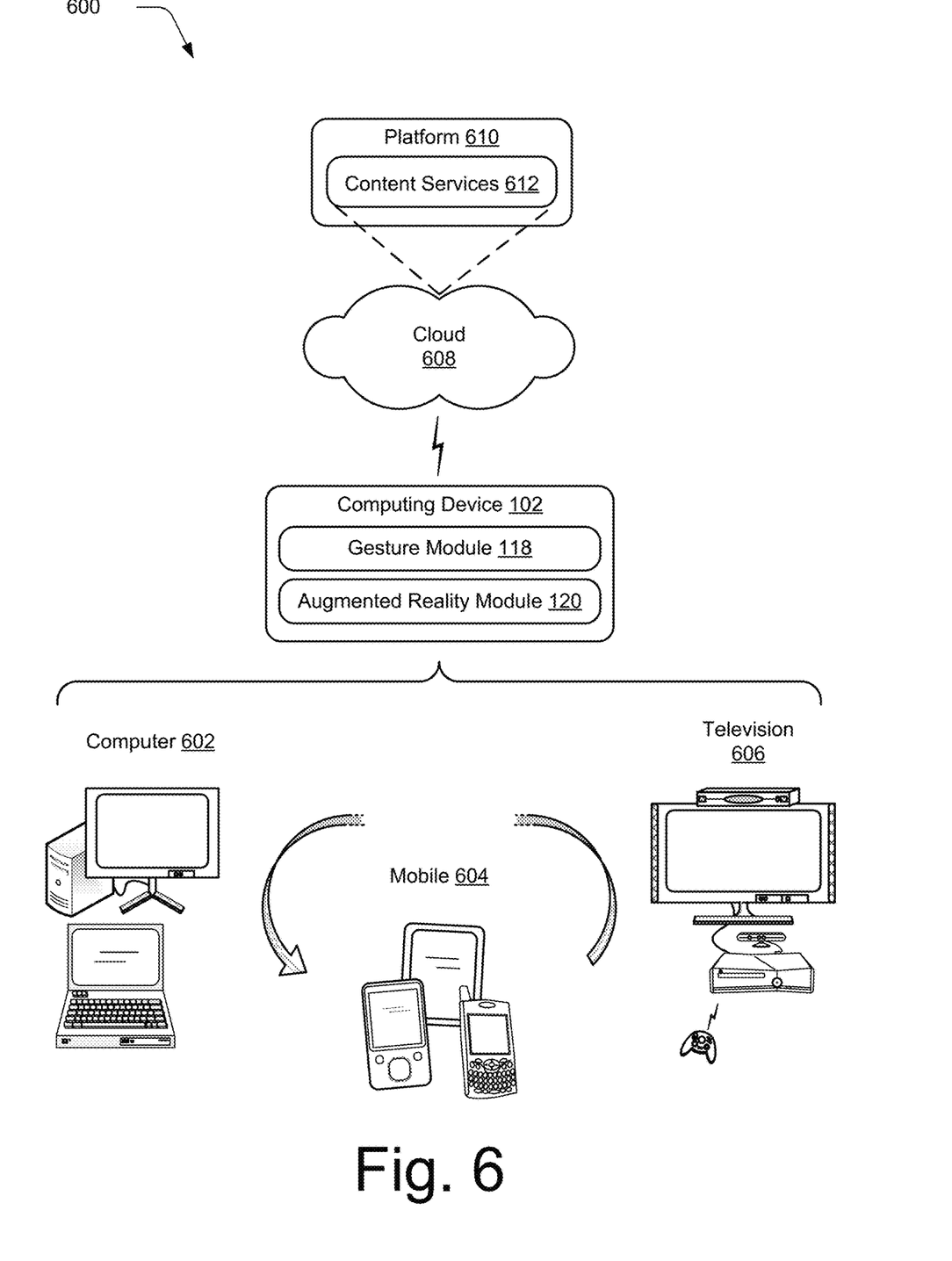
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 602 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein represented by the gesture module 118 and augmented reality module 120 may be supported by these various configurations of the computing device 102 and are not limited to the specific examples the techniques described herein, as well as "over the could" as described below.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
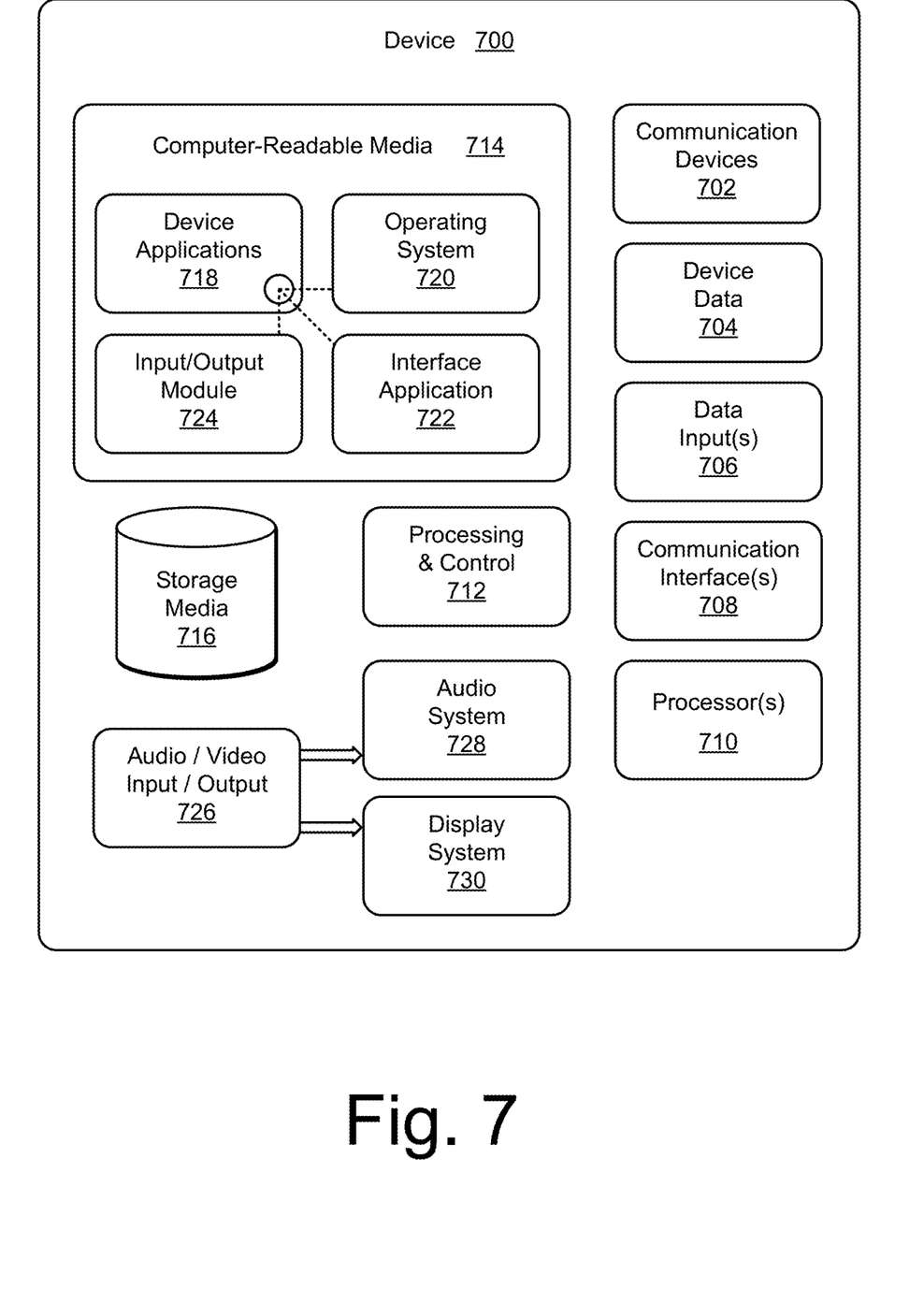
FIG. 7 illustrates various components of an example device that can be implemented as any type of computing device as described with reference to FIGS. 1, 2, and 6 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the gesture techniques described herein. In this example, the device applications 718 include an interface application 722 and an input/output module 724 (which may be the same or different as input/output module 114) that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700.

Alternatively, the audio system 728 and/or the display system 730 are implemented as integrated components of example device 700.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. A method implemented by a computing device, the method comprising:
   via a sensor, capturing data corresponding to a physical environment;
   based at least in part on using the data corresponding to the physical environment, forming at least one model of a static physical object that models one or more objects in the physical environment;
   identifying interaction of a dynamic object with the at least one model of the static physical object; and
   recognizing a gesture from the identified interaction of the dynamic object with the at least one model of the static physical object to initiate an operation of the computing device.

2. A method as described in claim 1, wherein the identified interaction includes identifying contact between the dynamic object and the static physical object by analyzing the data.

3. A method as described in claim 1, further comprising generating a geometry model using one or more images captured by the sensor, and wherein identifying the interaction of the dynamic object with the at least one model of the static physical object comprises using at least one image captured subsequent to the one or more images that were used to generate the geometry model.

4. A method as described claim 1, wherein the sensor is a depth camera and the data comprises depth data.

5. A method as described in claim 1, wherein recognizing the gesture comprises recognizing a user body part that is used in the identified interaction.

6. A method as described in claim 1, wherein recognizing the gesture comprises recognizing (1) positioning and movement of at least one finger of a user's hand and/or (2) movement of the user's hand as a whole.

7. A method as described in claim 1, wherein recognizing the gesture comprises recognizing the gesture from a single type of input.

8. A method as described in claim 1, wherein recognizing the gesture comprises recognizing the gesture from multiple types of input.

9. A method implemented by a computing device, the method comprising:
   via a sensor, capturing data corresponding to a physical environment;
   based at least in part on using the data corresponding to the physical environment, forming at least one model of a static physical object that models one or more objects in the physical environment;
   identifying contact between a dynamic object and the at least one model of the static physical object; and
   recognizing a gesture from the identified contact of the dynamic object with the at least one model of the static physical object to initiate an operation of the computing device.

10. A method as described in claim 9, further comprising generating the at least one model of the static physical object using one or more images captured by the sensor, and wherein identifying the contact between the dynamic object and the at least one model of the static physical object comprises using at least one image captured subsequent to the one or more images that were used to generate the at least one model of the static physical object.

11. A method as described in claim 9, wherein the model of the static physical object models one or more objects in the physical environment using a static geometry model.

12. A method as described in claim 9, wherein the model of the static physical object comprises a displayed image including the physical object.

13. A method as described in claim 9, wherein the sensor is a camera and the data includes images captured by the camera.

14. A method as described in claim 9, wherein the sensor is a depth camera and the data comprises depth data.

15. A method as described in claim 9, wherein the operation is to form a communication that identifies the gesture for communicating to another computing device to initiate another operation of the other computing device.

16. An apparatus comprising:
   a camera configured to capture data of a physical environment of the camera; and
   one or more modules communicatively coupled to the camera and configured to perform operations comprising:
      based at least in part on using the data corresponding to the physical environment, forming at least one model of a static physical object that models one or more objects in the physical environment;
      identifying interaction of a dynamic object with the at least one model of the static physical object; and
      recognizing a gesture from the identified interaction of the dynamic object with the at least one model of the static physical object to initiate an operation of a computing device.

17. An apparatus as described in claim 16, wherein the identified interaction includes identifying contact between the dynamic object and the static physical object by analyzing the data.

18. An apparatus as described in claim 16, wherein the one or more modules are configured to generate a geometry model using one or more images captured by the camera, and wherein identifying the interaction of the dynamic object with the at least one model of the static physical object comprises using at least one image captured subsequent to the one or more images that were used to generate the geometry model.

19. An apparatus as described in claim 16, wherein the camera is a depth camera and the data comprises depth data.

20. An apparatus as described in claim 16, wherein the operation is to form a communication that identifies the gesture for communicating to another computing device to initiate another operation of the other computing device.

* * * * *